(12) United States Patent
Percebois et al.

(10) Patent No.: US 7,883,119 B2
(45) Date of Patent: Feb. 8, 2011

(54) GLAND SEAL AND CORRESPONDING ASSEMBLY

(75) Inventors: Alain Percebois, Blenod les Pont-a-Mousson (FR); François Maire, Vandieres (FR); André Schneider, Pont-a-Mousson (FR); Roland Martin, Toul (FR)

(73) Assignee: Saint-Gobain Pam, Nancy (FR)

( * ) Notice: Subject to any disclaimer, the term of this patent is extended or adjusted under 35 U.S.C. 154(b) by 611 days.

(21) Appl. No.: 11/575,901

(22) PCT Filed: Sep. 21, 2005

(86) PCT No.: PCT/FR2005/002343

§ 371 (c)(1),
(2), (4) Date: Mar. 23, 2007

(87) PCT Pub. No.: WO2006/035141

PCT Pub. Date: Apr. 6, 2006

(65) Prior Publication Data

US 2007/0216112 A1  Sep. 20, 2007

(30) Foreign Application Priority Data

Sep. 24, 2004  (FR)  ................................. 04 10154

(51) Int. Cl.
*F16L 17/00* (2006.01)
(52) U.S. Cl. ........................ 285/104; 285/109; 285/232; 285/379

(58) Field of Classification Search ......... 285/104–105, 285/108–109, 232, 340, 374, 379
See application file for complete search history.

(56) References Cited

U.S. PATENT DOCUMENTS

| 2,398,399 | A | * | 4/1946 | Alexander | .................. 277/619 |
| 5,067,751 | A | * | 11/1991 | Walworth et al. | ........... 285/105 |
| 5,295,697 | A | * | 3/1994 | Weber et al. | ................ 277/616 |
| 5,360,218 | A | * | 11/1994 | Percebois et al. | ........... 277/619 |
| 6,174,000 | B1 | | 1/2001 | Nishi et al. | |
| 2003/0107214 | A1 | | 6/2003 | Holmes et al. | |

FOREIGN PATENT DOCUMENTS

| EP | 526 373 A1 | 2/1993 |
| EP | 552 123 A1 | 7/1993 |
| WO | WO99/53232 A1 | 10/1999 |
| WO | WO 00/11389 A1 | 3/2000 |

* cited by examiner

*Primary Examiner*—Aaron Dunwoody
*Assistant Examiner*—Fannie Kee
(74) *Attorney, Agent, or Firm*—Sughrue Mion, PLLC

(57) ABSTRACT

A composite gland sealing for the interlocking coupling of a housing end piece (8) including an anchoring groove (82), a plastic ring (14) and several locking inserts (20). Each locking insert (20) includes a radially external head (30) provided with a first front projection (50, 52) applicable against the annular front surface (90) of the anchoring groove (82). The head (30) comprises includes a second frontal projection (52, 50) radially shifted from the first front projection (50, 52).

14 Claims, 6 Drawing Sheets

GLAND SEAL AND CORRESPONDING ASSEMBLY

The present invention relates to a gland seal and a corresponding assembly.

BACKGROUND OF THE INVENTION

The present invention applies in particular to tight and locked assemblies of two cast iron pipes.

Document EP-A-526 373 describes a composite seal comprising a sealing body and an anchoring heel made of resilient material and a plurality of locking inserts made of rigid material embedded in the anchoring heel. These inserts are distributed uniformly over the whole circumference of the body. Each insert is produced from metal and has an anchoring head designed to rest on the bottom of an anchoring groove arranged in a socket end, and also catching teeth adapted to engage in the outer surface of a spigot so as to prevent axial movements that might separate the spigot from the socket end under the action of axial forces caused by the pressure of the fluid circulating through the spigot and the socket end.

The inclination of each locking insert depends on the play between the external diameter of the spigot and the internal diameter of the socket end. Catching of the insert on the spigot induces a reaction force, the angle of inclination of which over the median direction varies depending on the play present between the assembled ends.

The greater this angle of reaction, measured in relation to the radial direction, the more the locking resists the internal pressure of the fluid circulating through the assembly. On the other hand, catching of the inserts in the outer surface of the spigot improves as the angle of reaction gets smaller. Indeed, if the angle is too great, there is a risk that the teeth of the inserts may not catch on the spigot when it is put under pressure, and may slide thereon causing faulty locking.

The risk of poor performance under pressure is critical with regard to the maximum amounts of play where the angle of reaction is naturally small, while the risk of poor catching of the inserts is critical with regard to the minimum amounts of play where the angle of reaction is naturally high.

SUMMARY OF THE INVENTION

The object of the invention, starting from the known assembly of the aforementioned document, is to optimize the compromise between the reliability of catching of the insert on the spigot and the performance under pressure of the locking.

Accordingly, the invention relates to an assembly comprising novel features.

BRIEF DESCRIPTION OF THE DRAWINGS

The invention will be better understood on reading the description that follows, given purely as an example and with reference to the accompanying drawings, in which.

DETAILED DESCRIPTION OF THE INVENTION

Figure 1:
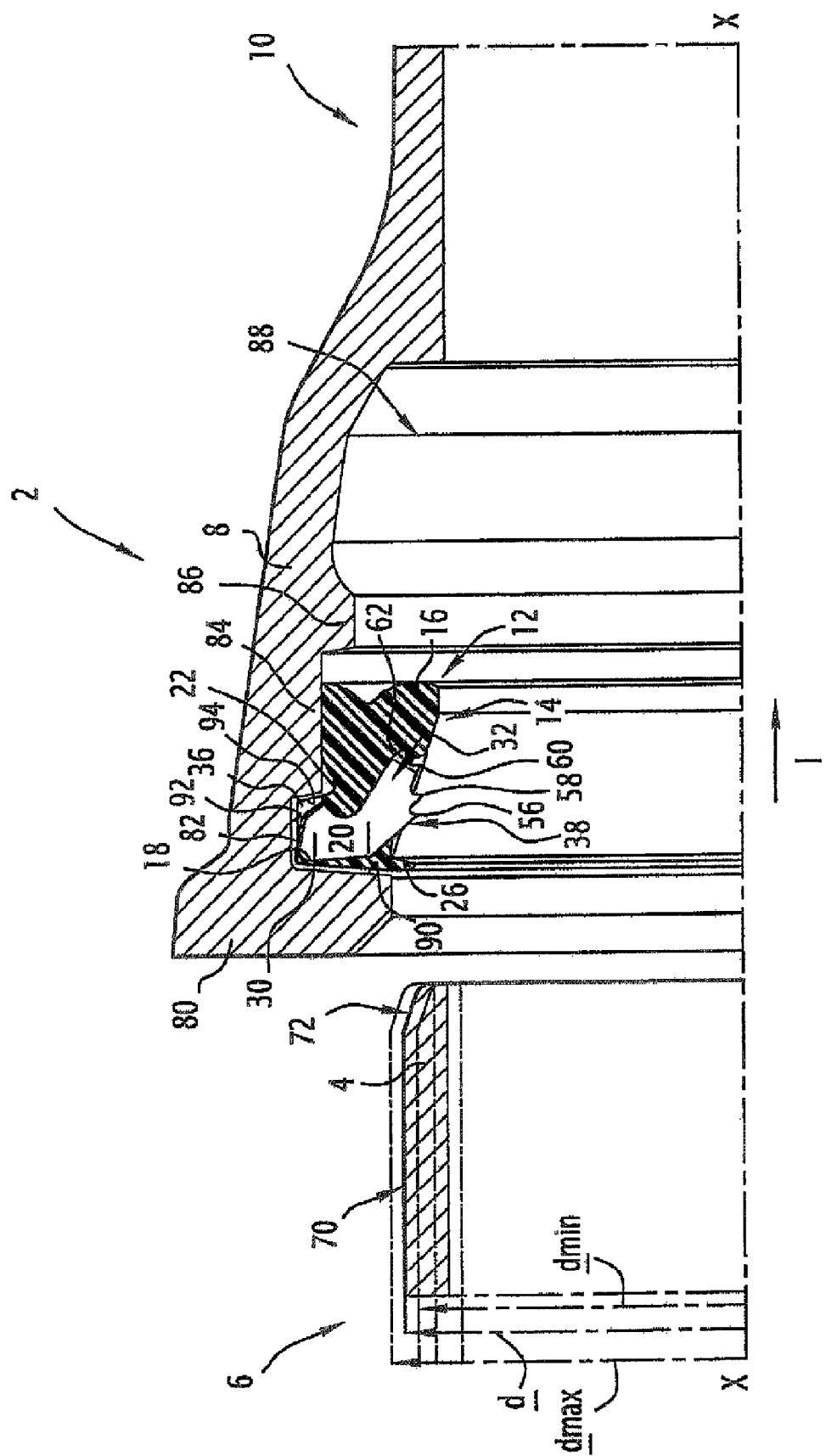
FIGS. 1 to 3 are half-views in a meridian section of an assembly of two pipes and a composite seal interposed between them, respectively before, during and after producing the locked assembly according to the invention.
Figure 2:
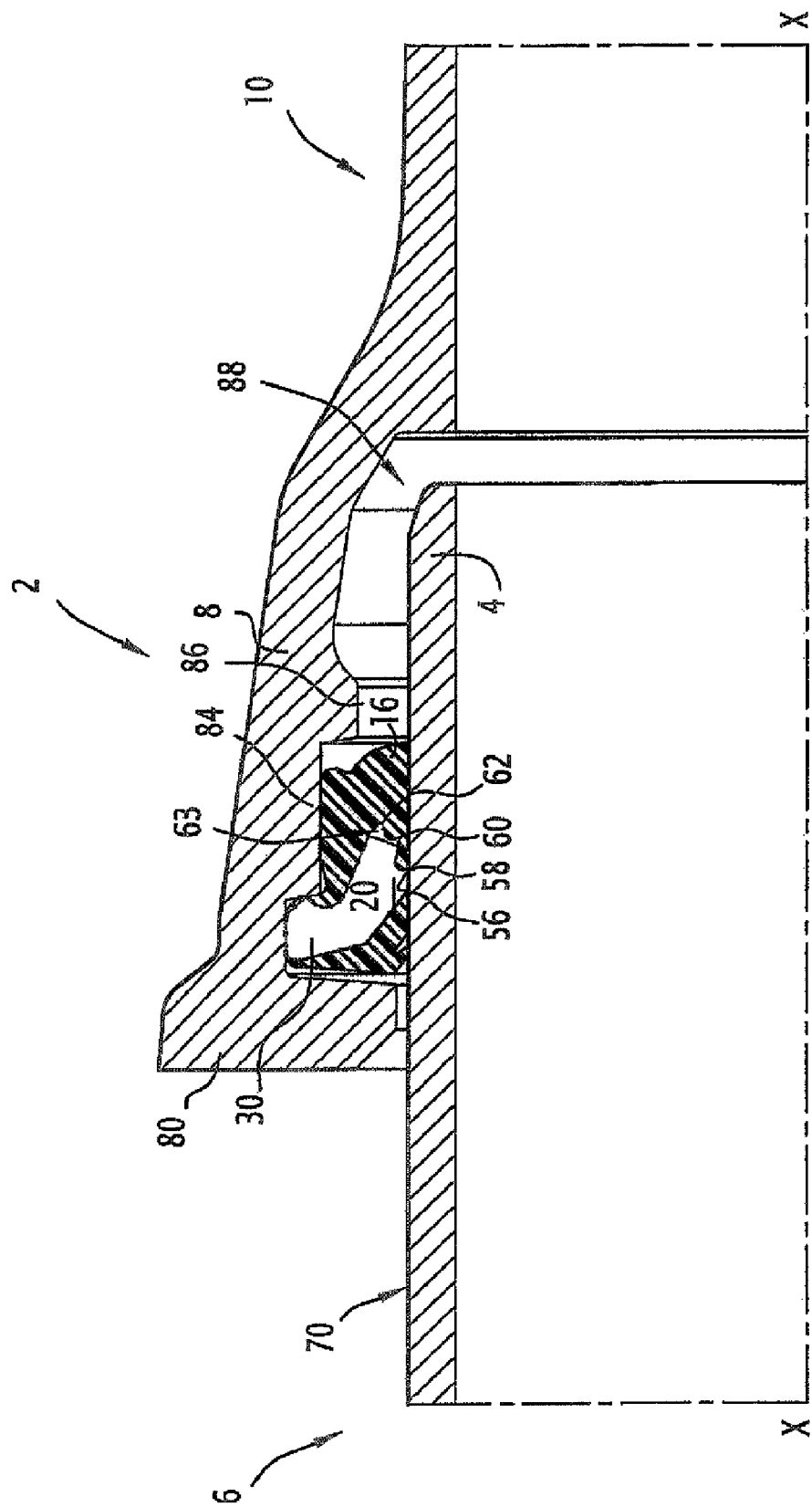
Figure 3:
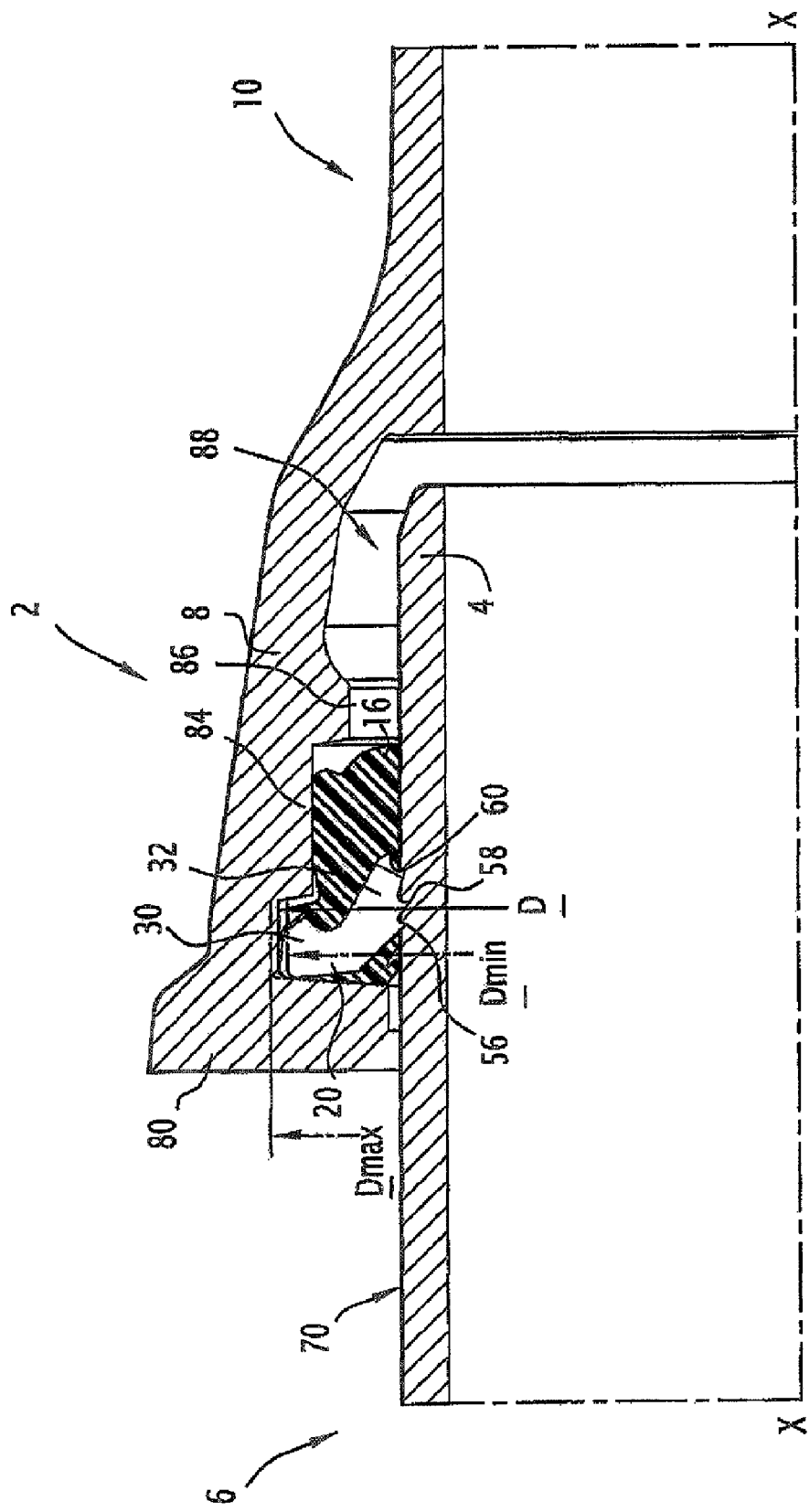

Illustrated in FIGS. 1 to 3 is a tight and locked assembly according to the invention, designated by the general reference numeral 2.

The tight assembly 2 comprises a spigot 4 or male end integral with a first pipe 6, a socket end 8 or female end integral with a second pipe 10, and a seal 12.

The assembly 2 extends along a centre line X-X. Hereinafter, the expressions "radially", "axially", "circumferentially" and "meridian" will be used in relation to this axis.

The seal 12 comprises, in a meridian section, a resilient ring 14 produced from flexible or resilient material, for example from an elastomer, which extends around the centre line X-X, in which are embedded a plurality of locking inserts 20.

The resilient ring 14 comprises a solid annular body 16 towards the bottom of the socket and, on the entry side of the socket, an anchoring heel 18 projecting radially outwards and a circular sealing lip 26 projecting radially inwards.

The body 16 and the heel 18 are separated by a peripheral groove 22. In a variant which is not illustrated, this groove 22 may be replaced by recesses which are aligned circumferentially with the inserts.

The lip 26 extends substantially radially towards the axis X-X until it approaches the minimum internal diameter of the body 16. The inserts 20 are distributed uniformly over the whole of the circumference of the ring 14. Each locking insert 20 is of very hard, extruded or sintered material, a hard metal alloy or ceramic, for example.

Each insert 20 comprises, in a meridian view, a radially external head 30 and a radially internal foot 32. The head 30 extends substantially radially in relation to the axis X-X, while the foot 32 is inclined to this axis, in such a way that it converges towards the axis X-X in an introduction direction I of the spigot 4 into the socket end 8. The insert 20 therefore has a bent profile.

Each insert 20 is partly embedded in the anchoring heel 18 of the seal 12 and partly covered by the resilient material of the heel 18. However, the heel 18 comprises recesses 36 in line with the inserts 20. The recesses 36 are radially open towards the exterior, in such a way that the radially external end of the head 30 is free of resilient material. The recesses 36 are also axially open in the introduction direction I.

Similarly, the seal 12 comprises recesses 38, open radially towards the interior, and located at the site of the inserts 20, in such a way that the radially internal end of the feet 32 is free of resilient material.

Figure 6:
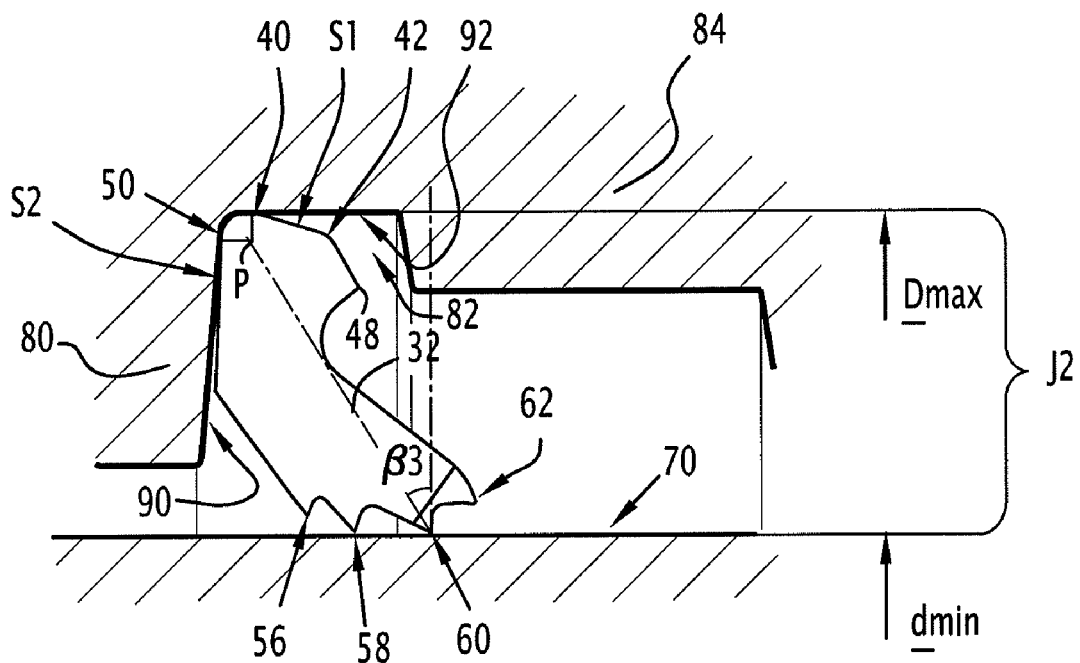
FIGS. 6 and 7 are enlarged views in a meridian section of a portion of the assembly according to the invention at different stages of assembly, the socket end and the spigot defining maximum play therebetween.

As can be seen more precisely in FIG. 6, the head 30 comprises at its radially external end a profile forming two radial projections 40, 42 which are axially offset from each other. The head 30 also comprises a retention tip 48 with a sharp edge directed axially in the direction I. The tip 48 is free of resilient material because of the recess 36.

The head 30 also comprises two frontal projections 50, 52 radially offset from each other and extending substantially parallel to the centre line X-X.

A substantially planar surface S1 extends between the two radial projections 40, 42 and a substantially planar surface S2 extends between the two frontal projections 50, 52. These surfaces S1, S2 form between them an angle $\alpha$ which is less than 90°.

In addition, the foot 32 comprises at its radially internal end three axially offset catching teeth 56, 58, 60 which are adapted to catch on the outer surface 70 of the spigot (see below) and which, when the seal is in the rest state, extend beyond the resilient ring 14. In a meridian view, the teeth 56, 58, 60 extend over a convex curve C. In addition, the foot 32 comprises, on the axial side opposite the head 30, a catching end stop 62 embedded in the body 16. The catching end stop 62 has, in a meridian view, a profile which is rounded compared to the profile of the catching teeth 56, 58, 60.

The end stop 62, the function of which is to limit the penetration of the insert 20 into the spigot 4 so as not to damage said spigot, has a rounded or domed shape to promote the "flow" of the elastomer when fitting the spigot 4, so as to avoid stress concentrations that could cause tears in the elastomer. Advantageously, the lateral faces 63 of the end stop 62 of the insert in axial view are chamfered or rounded so as to avoid sharp edges that might also tear the elastomer during fitting.

Referring once again to FIG. 1, it can be seen that the spigot 4 comprises a cylindrical outer surface 70 of diameter d provided with an entry chamfer 72. The spigot 4 is manufactured with diametral tolerances such that the actual diameter d may be situated between a maximum external diameter $d_{max}$ and a minimum external diameter $d_{min}$. The diameters $d_{max}$ and $d_{min}$ are indicated in dot-dash lines in FIG. 1.

The socket end 8 comprises in succession, axially from the entry of the socket towards the bottom, an entry collar 80, an annular anchoring groove 82 serving to accommodate the anchoring heel 18 of the seal, a tiered portion 84, an internal rib 86 and a reception cavity 88, freely receiving the end of the spigot 4.

The annular anchoring groove 82 is delimited by an annular frontal surface 90 of the entry collar 80, by a cylindrical bottom surface 92 of circular cross-section with the axis X-X, and by a frontal surface 94 of the tiered portion 84. Generally, the frontal surface 90 extends at an angle of at least 80° to the centre line X-X and has an axial component directed in the direction I. Preferably, the frontal surface 90 produces an angle of at least 85° with the axis X-X. In addition, the annular frontal surface 90 is directly connected to the bottom surface 92, in such a way that, for any play between the surfaces 70 and 92 within the range of accepted tolerances, the insert 20 is applied to the frontal surface and to the bottom surface 92 when the pipes are subjected to the internal pressure of the fluid they transport.

Moreover, the annular frontal surface 90 and the bottom surface 92 define between them an angle which is greater than the angle α between the planar surfaces S1 and S2.

The frontal surface 94 is directed towards the entry collar 80, opposite to the direction I.

As indicated in FIG. 3, the bottom surface 92 is also subject to manufacturing tolerances, so that its actual diameter D may vary between a maximum diameter $D_{max}$ and a minimum diameter $D_{min}$.

The assembly according to the invention is assembled in the following way.

The seal 12 is first introduced into the socket end 8, the body 16 being placed against the tiered portion 84 and the anchoring heel 18 being seated in the annular anchoring groove 82, in such a way that the axis of the seal 12 merges with that of the socket end.

The spigot 4 is then aligned with the socket and introduced through the seal 12 in the direction I by first folding back the lip 26 which is applied with some pressure to the outer surface 70. When the spigot 4 crosses the threshold of the inserts 20, these inserts are tilted by angular deflection against the body 16. The introduction of the spigot 4 continues until its chamfer 72 approaches the bottom of the cavity 88. The spigot 4 is then taken backwards axially so as to cause the inserts 20 to be pushed back. The inserts 20 alter their tilt in relation to the axis X-X by a small angular deflection counter to the previous one. During this brushing up, at least one of the teeth 56, 58, 60 catches on the outer surface 70 of the spigot 4 and thus offers substantial resistance to the continuation of the axial withdrawal movement of the spigot 4. The assembly is therefore locked.

Next, referring to FIGS. 4 to 7, the operation of the seal according to the invention will be described in terms of the diametral tolerances on the diameters d and D under the action of the fluid under pressure. In these Figs., the ring 14 has been omitted for greater clarity of illustration.

After the aforementioned angular deflection of the inserts 20 during assembly of the pipes 6 and 10, each insert 20 assumes a tilted position which varies according to the play present between the diameters d and D.

Figure 4:
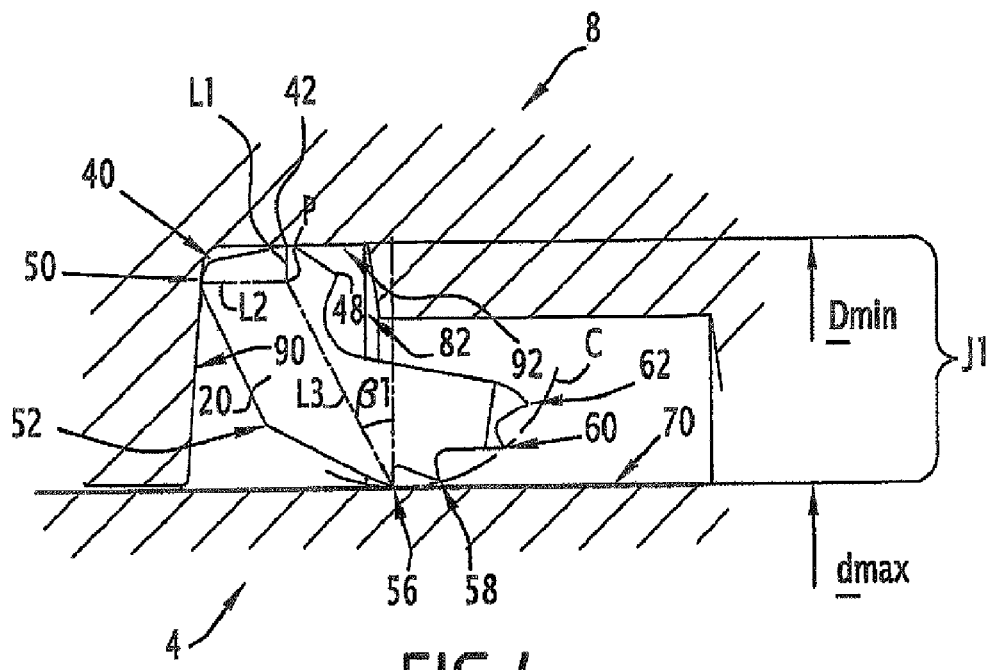
FIGS. 4 and 5 are enlarged views in a meridian section of a portion of the assembly according to the invention at different stages of assembly, the socket end and the spigot defining minimum play therebetween.

In FIG. 4, the position of an insert 20 is illustrated during catching on the spigot 4 when put under pressure in the case where the play between the pipes is the minimum play J1. Accordingly, the socket end 8 comprises an anchoring groove 82 the diameter D of which corresponds to the minimum diameter $D_{min}$, while the spigot 4 has a surface 70 the external diameter d of which corresponds to the maximum diameter $d_{max}$. The two diameters $D_{min}$ and $d_{max}$ thus define a minimum play J1 between the two surfaces 92 and 70.

It can be seen that, when catching on the spigot 4, the insert 20 is placed at two points against the groove 82, firstly with its second radial projection 42 against the bottom surface 92 and secondly with its first frontal projection 50 against the frontal surface 90. Moreover, only the catching tooth 56 nearest the socket entry is placed against the outer surface 70.

The insert 20 is tilted at an angle of reaction defined in the following way. In a meridian view, the two lines L1, L2 which extend perpendicular to the surfaces 92, 90 in the region of the respective projections 42, 50 for applying the insert 20 against the groove 82, intersect at a point P. The point of application of the tooth 56 on the surface 70 defines with the point P a third line L3 serving to support the reaction force of the insert 20. The angle β 1 measured between this line L3 and a plane perpendicular to the axis X-X is called the "angle of reaction".

The smaller the angle of reaction, the better the catching of the insert 20. The presence of the second radial projection 42, nearer axially to the tooth 56 than the first radial projection 40, ensures that point P is in a position that is axially relatively close to the tooth 56, in such a way that the angle β 1 is small for the given play J1, which promotes catching of the locking insert 20 on the surface 70.

Figure 5:
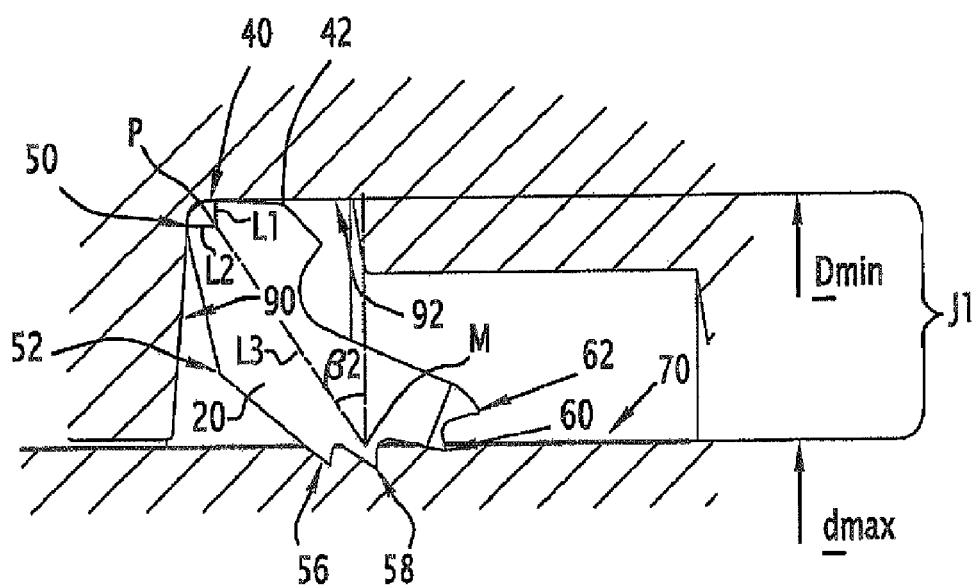

In FIG. 5 the portion of the assembly of FIG. 4 is illustrated when the pressure is established.

It can be seen that, after the insert 20 has been caught, it has rocked in a clockwise direction compared to FIG. 4, and that the three catching teeth 56, 58, 60 now penetrate into the material of the spigot 4.

The locking insert 20 is no longer placed with its second radial projection 42 against the bottom surface 92, but is now placed exclusively with its first radial projection 40 against the surface 92, and exclusively with its first frontal projection 50 against the frontal surface 90.

The point P is the intersection of the lines L1, L2, normal to the surfaces 92, 90 in the region of the projections 40, 50.

The assembly defines a line L3, which extends between the point P and a point M situated midway axially between the catching teeth 56 and 60.

The line L3 defines with the radial direction an angle of reaction β 2 which is therefore relatively large for the given play J1, and this leads to good performance under pressure of the locked assembly.

It should be noted that, when the insert 20 rocks when put under pressure, the loss of contact in the region of the second radial projection 42 allows the angle of reaction to be increased and among other things thus compensates for the reduction in the angle of reaction resulting from the rocking of the insert in a clockwise direction; a sufficiently large angle β 2 is thus achieved to guarantee good performance under pressure.

FIG. 6 shows a similar assembly to that of FIG. 4 with the following differences.

The surface 92 has a diameter $D_{max}$, while the surface 70 has a diameter $d_{min}$, such that these two surfaces define between them a play J2 greater than the play J1. This play J2 is the maximum play accepted for the manufacturing tolerances of the spigot 4 and the socket end 8.

It can be seen that, when catching on the spigot 4 once put under pressure, the insert 20 is placed at two points against the groove 82, firstly with its first radial projection 40 against the bottom surface 92 and secondly with its first frontal projection 50 against the frontal surface 90. Moreover, only the catching tooth 60 farthest from the socket entry is placed against the outer surface 70.

The angle of reaction β 3 obtained is measured between the radial direction and a line passing through the point P, substantially identical to that of the assembly of FIG. 5, and by the point of contact between the surface 70 and the tooth 60. This angle β 3 is small and therefore compatible with correct catching of the insert 20.

Figure 7:
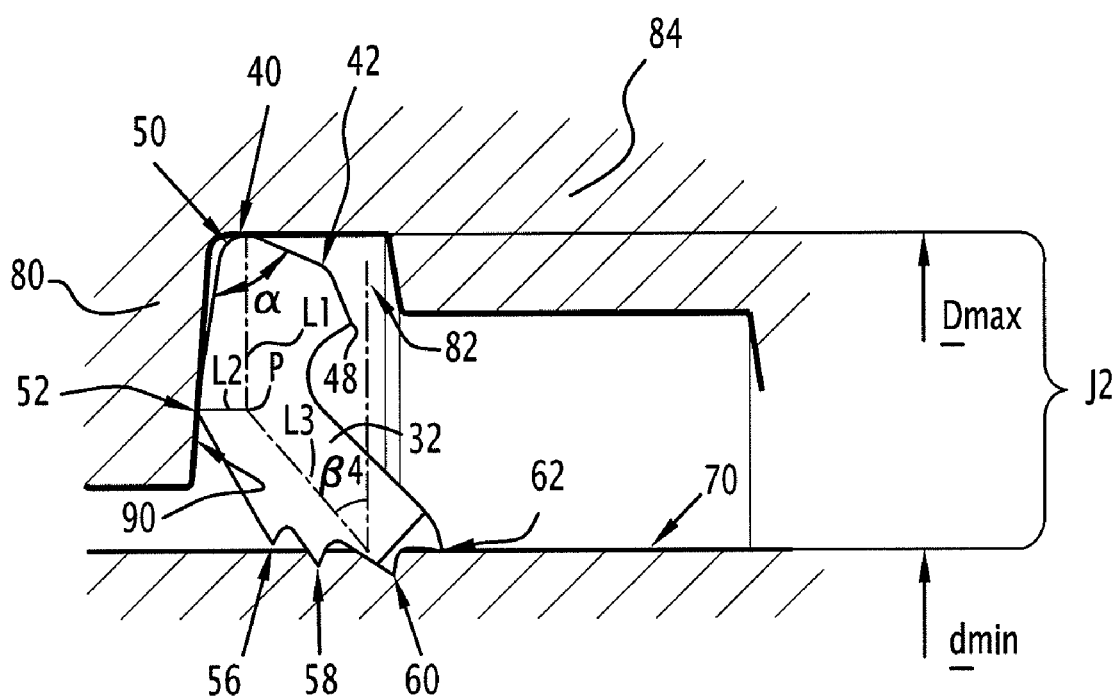

FIG. 7 shows the assembly of FIG. 6 once the pressure has been established, and therefore after catching of the insert 20 and after rocking thereof in the clockwise direction.

At the end of this rocking, the insert 20 is placed exclusively with its first radial projection 40 against the bottom surface 92 and exclusively with its second frontal projection 52 against the frontal surface 90, while the other projections 42 and 50 are out of contact with the surfaces 90 and 92. Furthermore, only the intermediate tooth 58 and the tooth 60 farthest from the socket entry are caught in the surface 70 of the spigot 4.

At maximum play J2, contact in the region of the second frontal projection 52 allows an increase in the angle of reaction and among other things compensation for the reduction in the angle of reaction resulting from the rocking of the insert in the clockwise direction when put under pressure; this projection 52 which generates a point P situated close to the axis X-X therefore allows a final angle of reaction β4 to be obtained that is large enough to guarantee good performance under pressure of the locked assembly.

Figure 8:
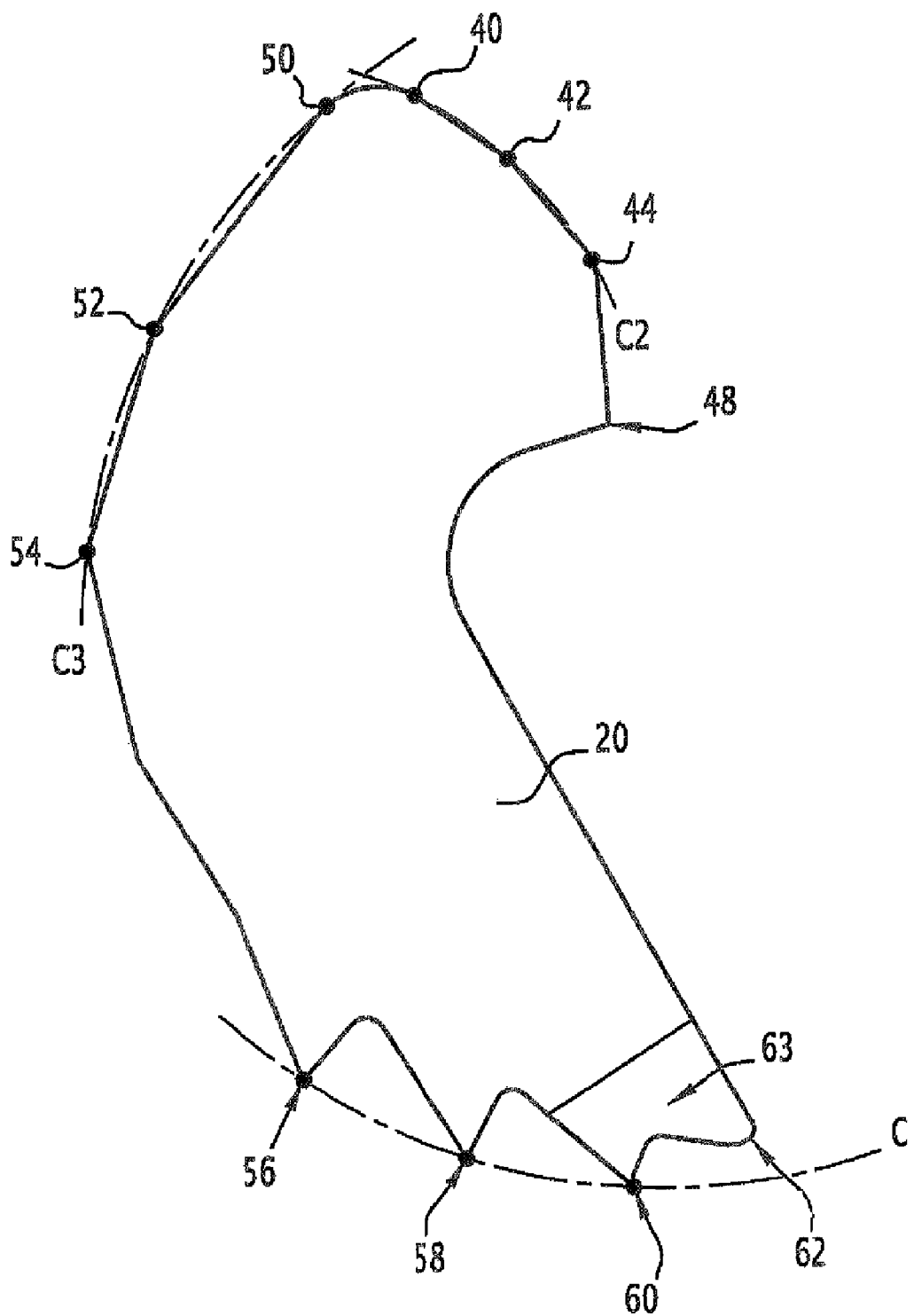
FIG. 8 is a meridian view of a locking insert according to a variant of the invention.

In FIG. 8 a variant of the insert 20 according to the invention is illustrated.

Hereinafter, only the differences in relation to the previously described insert 20 will be mentioned. Like elements have like reference numerals.

This locking insert 20 comprises three radial projections 40, 42, 44 which are axially offset, and which extend, in a meridian view, over a convex curve C2.

Furthermore, the locking insert 20 comprises three frontal projections 50, 52, 54 radially offset from the axis X-X, and situated, in a meridian view, on a convex curve C3.

The geometric characteristics of the inserts 20 allow the aforementioned seal to produce a good compromise between the catching of the inserts on the spigot and performance under pressure, regardless of the actual play between the surfaces 70 and 92.

Moreover, the recesses 36 give more reliable support to the inserts 20 with regard to the minimal play, by reducing the fitting stress of the spigot 4 and avoiding compression stresses in the elastomer that could lead to poor positioning of the inserts 20 by rocking in a direction that tends to increase the angle of reaction (and therefore to impair correct catching of the inserts 20 at minimum play). Furthermore, in combination with the groove 22, the recesses 36 facilitate the overall deformation of the ring 14 when the seal is put in place in the socket end.

The invention claimed is:

1. A tight and locked assembly comprising:
a spigot of a first piping element, which comprises an outer cylindrical surface,
a socket end of a second piping element, and
a composite seal for a tight and locked assembly between the spigot and the socket end,
the socket end comprising an anchoring groove which is delimited by a cylindrical bottom surface, extending radially outward from a centre line of the assembly, and an annular frontal surface,
the seal comprising:
a ring made of resilient material extending around the centre line, having a body, compressed radially between the socket end and the spigot, and having an anchoring heel accommodated in the anchoring groove, and
a plurality of locking inserts made of a rigid material at least partly embedded in the anchoring heel,
each locking insert comprising a radially external head, embedded at least partly in the anchoring heel and designed to be placed in the anchoring groove and also a radially internal foot, designed to be placed against the spigot, the head comprising a first radial projection, adapted to be placed against the cylindrical bottom surface of the anchoring groove, and first and second frontal projections, the second frontal projection being radially offset from the first frontal projection,
wherein the annular frontal surface is connected directly to the cylindrical bottom surface such that the outer cylindrical surface and the cylindrical bottom surface define a play, the play being between a minimal play J1 and a maximum play J2 defined by manufacturing tolerances of a diameter of the outer cylindrical surface of the spigot end and a diameter of the cylindrical bottom surface of the socket end, in such a way that the insert is placed against the annular frontal surface and against the cylindrical bottom surface when the spigot and the socket end are subjected to an internal pressure of a fluid, and
wherein the first frontal projection is placed against the annular frontal surface at the minimal play J1 and the second frontal projection is placed against the annular frontal surface at the maximum play J2.

2. The assembly according to claim 1, wherein the head comprises at least a third frontal projection, radially offset from the first and second frontal projections and adapted to be placed against the annular frontal surface of the anchoring groove.

3. The assembly according to claim 1, wherein the head comprises at least a second radial projection, axially offset from the first radial projection and adapted to be placed against the cylindrical bottom surface of the anchoring groove.

4. The assembly according to claim 3, wherein the first and second frontal projections are connected by a first planar surface and the first and second radial projections are connected by a second planar surface, and in that the angle between these two surfaces is less than 90°.

5. The assembly according to claim 4, wherein the annular frontal surface and the cylindrical bottom surface define between them an angle which is greater than the angle between the first planar surface and the second planar surface.

6. The assembly according to claim 5, wherein the cylindrical bottom surface extends coaxially in relation to the centre line, and the annular frontal surface is formed by an entry collar of the socket end, the annular frontal surface having an axial component directed in an introduction direction of the spigot into the socket end.

7. The assembly according to either claim 5, wherein the annular frontal surface extends at an angle of at least 80° to the centre line.

8. The assembly according to claim 1, wherein, as seen in a meridian section along the centre line, the foot comprises at least two catching teeth adapted to be caught on the outer cylindrical surface of the spigot and extending outside the ring.

9. The assembly according to claim 8, wherein the foot comprises a catching end stop which is embedded in the body and which is arranged on the side axially opposite the head.

10. The assembly according to claim 9, wherein the catching end stop has, as seen in a meridian section along the centre line, a profile that is more rounded than a profile of the catching teeth.

11. The assembly according to claim 9, wherein the catching end stop comprises lateral surfaces which, in an axial view along the centre line, are chamfered or rounded.

12. The assembly according to claim 1, wherein the ring comprises at least one recess in line with a locking insert, and in that the recess is open radially towards the exterior in such a way that a radial end of the head is free of the resilient material of the ring.

13. The assembly according to claim 12, wherein the head of each locking insert comprises a retention tip directed axially opposite the first frontal projection, and in that the recess is open axially so that the retention tip is free of the resilient material of the ring.

14. The assembly according to claim 1, wherein the anchoring heel and the body are separated by at least a cavity, defined as a peripheral groove or recesses aligned circumferentially with the inserts.

* * * * *